May 22, 1962  G. A. HOSSO  3,035,381
PLASTIC BAG SEALER

Filed Jan. 9, 1959  2 Sheets-Sheet 1

INVENTOR:
GEORGE A. HOSSO
BY
ATT'Y

May 22, 1962 G. A. HOSSO 3,035,381
PLASTIC BAG SEALER
Filed Jan. 9, 1959 2 Sheets-Sheet 2

INVENTOR:
GEORGE A. HOSSO
BY
*Kent W. Wonnell*
ATT'Y

United States Patent Office 3,035,381
Patented May 22, 1962

3,035,381
PLASTIC BAG SEALER
George A. Hosso, 1032 Fulton St., Chicago, Ill.
Filed Jan. 9, 1959, Ser. No. 785,952
2 Claims. (Cl. 53—182)

This invention relates to the sealing of articles in plastic covers and is more particularly described as a hand operated bag sealer for shirts in a laundry for ironed shirts although it may have a more general use for sealing various other articles of merchandise. Bag staplers and sealers are now commonly operated to contain many different articles but the present invention relates to a hand operated sealer in which a continuous film folded upon itself is sealed and cut in one operation to provide an enclosure open at one end which is particularly adapted to contain and protect various articles which are visible through the plastic sealing material, and is therefore particularly desirable for use in connection with articles of merchandise which can be sufficiently viewed or inspected without handling the goods.

An important object of this invention is therefore in the provision of a hand sealer which may be operated to cut and seal a complete package with a manual operation of one hand, the article to be enclosed being fed with the other hand.

A further object of the invention is to provide an improved sealing blade which severs an enclosing film and at the same time seals the film at both sides of the cut.

A further object of the invention is to provide an improved sealing and cutting blade for polyethylene and similar transparent sheets in which a heating element is inserted at one end of the blade.

Still a further object of the invention is to provide a Teflon cover for the sealing blade which engages the sealing sheet for heating and cutting it, but prevents adherence to the material of the sheet.

Still a further object of the invention is to provide stripping means in connection with the sealing blade and located at the sides thereof for insuring the smooth stretching of the sheets to be sealed over the base before the cutting and sealing operation of the blade is effected.

Other objects of the invention are to mount the cutting and sealing blade to swing upwardly at one side of the path of movement of the sealing material; to seat the heating element in a channeled groove of the cutting and sealing blade; to provide an enclosed casing for the sealing blade; to mount the blade in insulating blocks at the ends of the casing and to provide a thermostat for an electrical connection to the heating element for the blade which is accessible for variation through the said casing.

Other objects of the invention will appear in the specification and will be more apparent from the accompanying drawings in which, In the drawings, FIG. 1 is a perspective view of the hand operated sealer in accordance with this invention, as used for sealing laundered shirts and the like.

Figure 1:
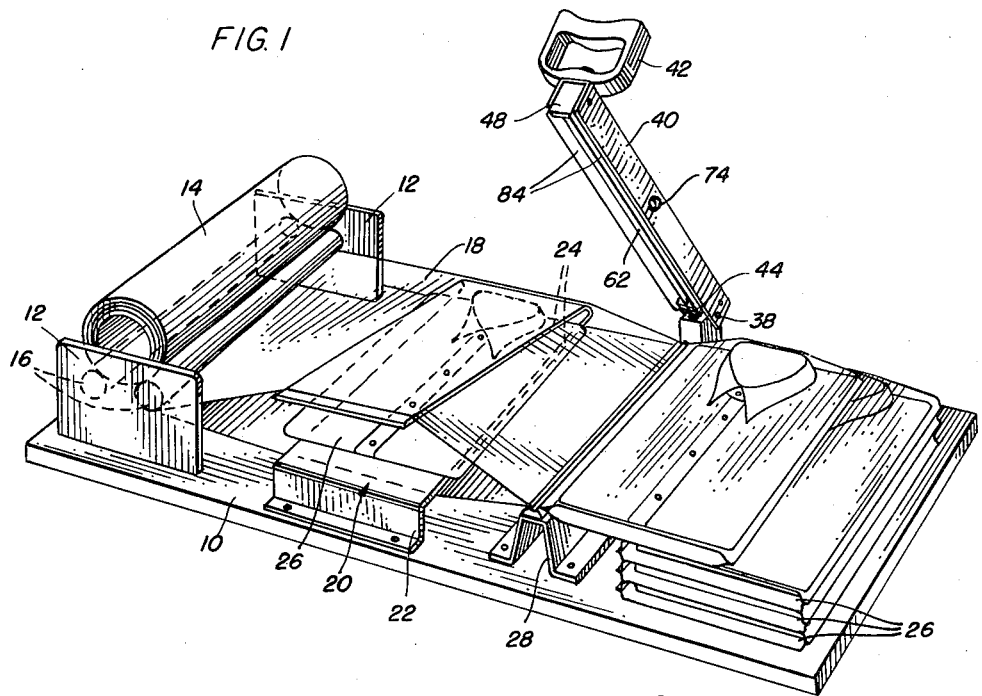
Figure 2:
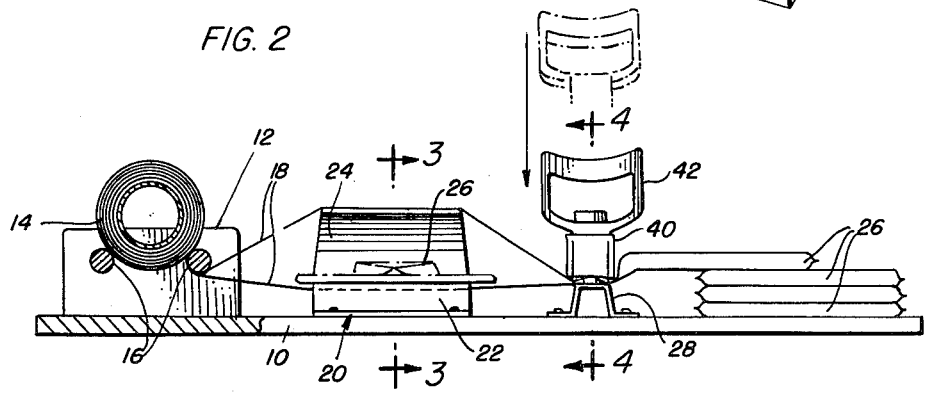
FIG. 2 is a front elevation with some of the parts in section showing the sealer of FIG. 1 in sealing position.
Figure 3:
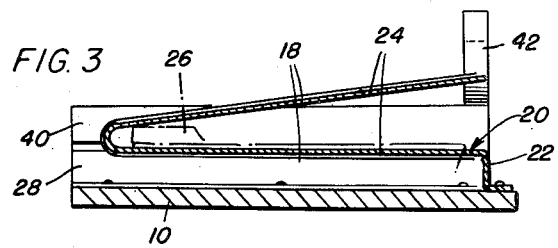
FIG. 3 is a sectional view taken on the line 3—3 of FIG. 2.
Figure 4:
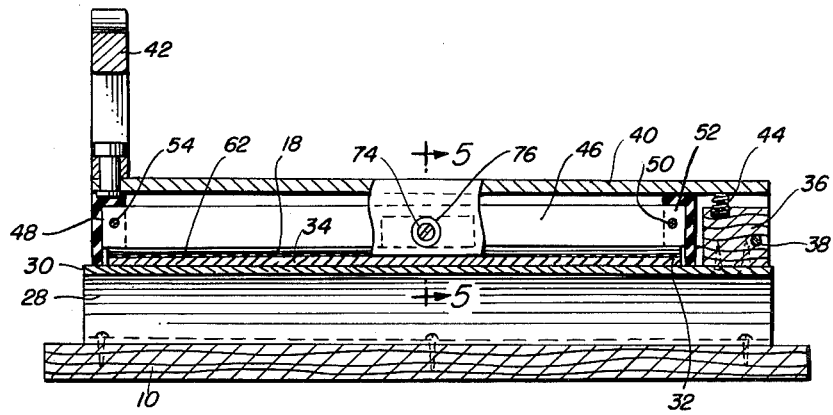
FIG. 4 is a longitudinal sectional view of a sealing element and its supporting base in sealing position.

It is a common practice to package and seal various articles of merchandise in a transparent plastic cover, and the present invention is specific to a particular type of packaging by a hand operated sealer in which one sealing operation only is necessary for sealing each article, after the original or starting seal has been made, the plastic material being doubled upon itself for this use so that the finished package is closed on three sides and open at the fourth. The operation herein shown and described is particularly adapted for enclosing and sealing substantially flat articles or those that have some thickness and still are substantially flat, such as laundered shirts, towels, sheets, small dresses or any other goods or wares which may be sufficiently enclosed by inserting them between the two connected sides of a covering film and sealing the successive edges of the film between the articles as they are enclosed.

Referring now more particularly to the drawings, a common supporting base 10 is usually provided for combining and associating the parts of this sealer comprising a plastic roll support, a spreader and a cutter and sealer.

The plastic roll support comprises two end plates 12 spaced apart approximately the length of a roll 14 of plastic sealing material which is mounted for free movement between the end plates on freely rotatable supporting rollers 16 for carrying the roll thereon with a longitudinally doubled thickness of the plastic 18 passing under one of the rollers adjacent to a spreader 20 which also constitutes a guide over which both webs of the doubled plastic are extended. The spreader has a flange 22 by which it is secured to one side of the base 10 to raise a folded or V-shaped guide 24 which extends to the opposite side of the base and in the path of the folded plastic 18, the webs of which are passed under the guide adjacent the base and over the extending side of the guide with the folded portion at the apex of the bend, leaving the front or one end of the guide open and unobstructed and the plastic correspondingly spread so that any article of merchandise such, for example, as a shirt 26 may be inserted between the sides of the V-shaped extension of the guide and between the spread open edges of the plastic. In this manner, the shirt or any other suitable article of merchandise intended to be covered or enclosed in the plastic is easily and quickly inserted between the webs thereof.

Secured to the base 10 outwardly from and beyond the spreader 20 is an anvil base 28 preferably formed of sheet metal with an upright hollow rib and outwardly projecting flanges by which it is secured to the supporting base. At the top of the anvil base is a flat portion 30 which extends the full length and transversely across the base 10 directly in the path of the plastic 18. On top of the anvil base and resting upon the flat top thereof is an anvil 32 with an undercut longitudinal groove at the top in which a contact strip 34 of resilient material such as silicone rubber is inserted so that both webs of the plastic material 18 will pass directly thereover as the plastic is manually drawn by an operator after the sealing operation.

A mounting block 36 is secured at the top of the anvil base and at the rear end thereof and has a transverse pivot 38 in which one end of a heater casing 40 is pivoted. The other end of the heater casing extends to the front edge of the supporting base 10 and extends to the forward end of the base 28 with an operating handle 42 secured to and projecting from the upper side of the casing for manual operation. At the rear of the casing between it and the mounting block 36 is a balancing spring 44 which tends to raise the heater casing and its connected parts to a position as shown in FIG. 1 when it is not manually depressed. The heater casing 40 is preferably rectangularly U-shaped and has openings in the top for the rapid dispersion of heat and so that it will not be objectionably hot for an operator. Within the casing is a heater blade 46 which extends from the front of the casing to a position short of the mounting block 36 and of substantially the same length as the contact strip 34 in the anvil 32.

The sealing and heater blade 46 is seated in the front end of the casing 40 inserting one end in a slot of an insulating block 48 which fits within the casing and held in place by a close fitting drive pin 50 which extends through the block and the blade frictionally engages in both sides of the casing. Similarly there is an insulating block 52 at the rear end of the heater blade having a slot which engages the end of the blade with a transverse drive pin 54 extending through the block and blade and engaging tightly in the walls of the heater casing.

The blade 46 is preferably formed of aluminum or some other suitable metal which readily transfers heat and it is preferably extruded, cast or otherwise formed with a hollow section having an opening 56 along one side of the blade with rounded upper 58 and lower 60 edges and with a sharp cutting and sealing edge 62 at the lower outer side which is covered with a thin but closely adhering coating 64 of Teflon. The extremity of this edge is slightly rounded so that the Teflon will not readily chip or become disengaged therefrom, the sides of this edge of the blade rounding sharply upward from the extremity.

Figure 5:
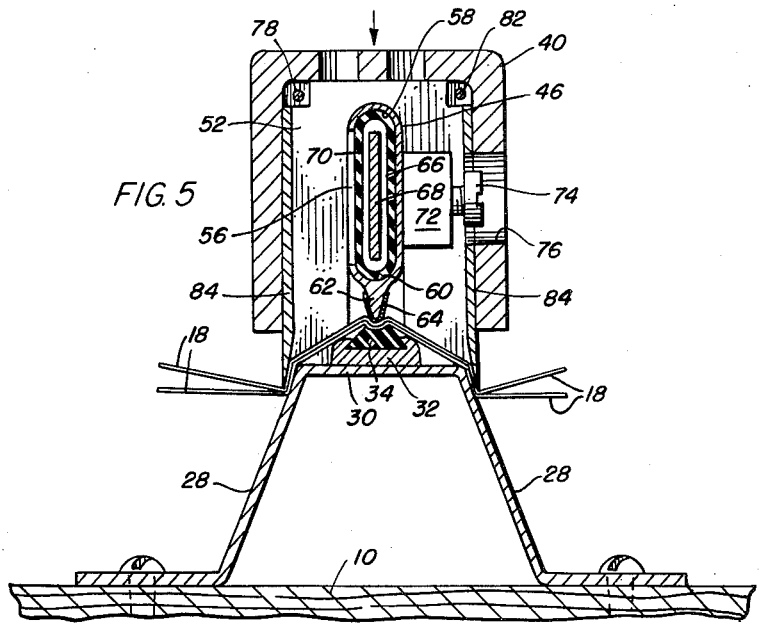
FIG. 5 is a sectional view taken on the line 5—5 of FIG 4.
Figure 6:
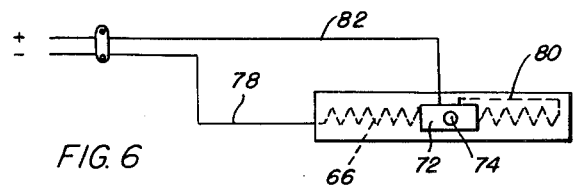
FIG. 6 is a diagrammatic view of the electrical connection and its thermostat for heating the sealing element.

Inside of the opening 56 of the heater blade is an electrical heater of the type having a conducting wire 66 (see FIGS. 5 and 6) wound upon a core 68 and surrounded on the outside by an insulating cover 70. This heater may be inserted endwise in the opening of the heater blade fitting closely therein, and it may be drawn endwise from the blade for substitution or repair. At one side of the blade 46 and connecting with the wire winding of the heater is an electro-thermostat 72 connected in any well known manner to automatically control the heat transmitted by the winding with an adjusting knob or screw 74 which is accessible from the outside of the casing 4 through an opening 76 therein for any suitable adjustment. One end of the heater winding may be connected by a conductor 78 to a source of current supply and the other end of the winding may be connected by a conductor 80 to the thermostat and from the thermostat by a conductor 82 to another electric terminal.

When the heater blade is heated to the proper temperature and is brought in contact with the polyethylene or other plastic material against the Silicone rubber on the anvil, the engagement of the sharp edge of the blade severs the plastic sheets and the upwardly curving edges of the blade engage the plastic sheets at both sides of the blade fusing and sealing the edges thereof tightly together and forming a close joint at each side of the cut line.

In order to hold the double sheets of plastic in firm contact with the Silicone contact material at the under side thereof, a pair of strippers 84 is secured one to each inner side of the heater casing 40, these strippers preferably comprising a stiff plastic material which projects downwardly from the casing to a point below the lowermost edge of the heating blade, flaring slightly outward therefrom to engage the upwardly converging sides of the anvil base 23 near hte top thereof so that the upper and lower webs of the plastic 18 are drawn tightly against the upper face of the Silicone strip 34. Thus the blade 46 will make a smooth and even cut of the two webs of plastic material and by the contact of the cut edges with the Teflon sides of the blade, a smooth and continuous joint is made at each side of the cut which does not adhere to the blade because of the character of the Teflon material at the sides of the blade which prevent sticking and adherence thereto.

In the over-all operation of the bag sealer, a roll of plastic material having a continuous lengthwise fold is placed upon the supporting rollers 16 and the two edges of the plastic are preferably inserted under the roller 16 adjacent the other operations, the two webs are separated and placed upon opposite sides of the spreader 20 and the two webs are drawn together over the anvil. The first sealing edge is produced by depressing the movable sealer against the anvil which is limited in its downward movement by the engagement of both of the insulating blocks 48 and 52 with the ends of the anvil base which project beyond the anvil 32, thus limiting the depression of the contact strip 34. This action cuts off an outermost strip of the plastic material but forms a seal at the outer edge of the remainder.

At this time the package sealing may be started by inserting an article to be wrapped or sealed within the spreader 20 at the front end thereof, the sealer being manually raised or allowed to raise under the action of its spring 44. The sealed end of the plastic strip is drawn beyond the sealer sufficiently to receive a shirt or any other article to be wrapped therein, and the sealer arm is then depressed to cut off the enclosed article close to the edge thereof and at the same time to seal the opposite cut edges of the plastic preparing the remainder of the plastic for the next article which is sealed in the same manner. In accomplishing this result, the heater within the sealing and cutting blade 46 is adjusted and maintained at the proper temperature by proper variation of the thermostat which is adjustable from the outside of the heater casing.

While a preferred embodiment of the invention has been described in some detail, it should be regarded by way of example and illustration rather than as a limitation or restriction of the invention as various changes in the construction, combination and arrangement of the parts may be made without departing from the spirit and scope of the invention.

I claim:

1. In a plastic sealer, the combination with a casing open at one side, of a heat blade mounted in the casing with a sharp edge of the blade in the open side of the casing, an anvil and a resilient contact material in the anvil for engaging the said sharp edge of the blade, an anvil support for the anvil, means mounting the casing to swing on the anvil base at one end of the casing, the sides of the anvil base converging slightly upward toward the top and spreaders attached to the edges of the casing at opposite sides of the blade and adapted to engage the converging sides of the anvil base for contacting opposite webs of plastic material to be cut and sealed by the blade at opposite sides of the blade for drawing the webs tightly over the anvil when the heat blade is applied thereto.

2. In a plastic sealer, a roller for receiving plastic material doubled longitudinally on itself but open at one side edge, means mounting the roller for continuous feeding of the material, a spreader extending between opposite webs of the doubled material adapted to receive articles to be wrapped in the open side edge of the doubled material, a heat sealer having a blade with a sharp edge and sides diverging therefrom, a resilient contact material for the under side of the webs opposite the sealing blade, means to simultaneously contact and sever doubled webs of said material at the sharp edge of the blade and to heat seal both webs of the material together at each side of the cut line, an arm pivotally mounted at one end for carrying the blade, means mounted on the arm at the sides of the blade and projecting in advance of the blade to engage webs at both sides and drawn tightly in the path of the blade, an anvil support for the resilient contact material having sides converging toward the top and adapted to engage the edges of said means projecting from the arms for engaging the webs at each side of the contact material and holding them tightly over the contact material between them for engaging the blade.

(References on following page)

References Cited in the file of this patent

UNITED STATES PATENTS

| | | |
|---|---|---|
| 1,714,265 | Gurwick | May 21, 1929 |
| 2,180,966 | Salfisberg | Nov. 21, 1939 |
| 2,237,119 | Smith | Apr. 1, 1941 |
| 2,651,444 | Casey et al. | Sept. 8, 1953 |
| 2,747,346 | Tigerman et al. | May 29, 1956 |
| 2,794,485 | Ashton et al. | June 4, 1957 |
| 2,796,913 | Fener | June 25, 1957 |
| 2,805,973 | Klasing et al. | Sept. 10, 1957 |
| 2,824,596 | Crawford | Feb. 25, 1958 |
| 2,877,609 | Bodolay et al. | Mar. 17, 1959 |
| 2,931,149 | Mitchell | Apr. 5, 1960 |
| 2,935,829 | Van Den Berg et al. | May 10, 1960 |